United States Patent [19]

Suzuki et al.

[11] Patent Number: 5,707,565
[45] Date of Patent: Jan. 13, 1998

[54] METHOD AND APPARATUS FOR MANUFACTURING A FERRULE

[75] Inventors: Kenji Suzuki; Hiroyuki Yamada; Koichi Takagi; Takashi Shigematsu; Mikio Ishihara, all of Tokyo, Japan

[73] Assignee: The Furukawa Electric Co., Ltd., Tokyo, Japan

[21] Appl. No.: 536,697

[22] Filed: Sep. 29, 1995

[30] Foreign Application Priority Data

Oct. 7, 1994 [JP] Japan ................................ 6-243902

[51] Int. Cl.⁶ .......................... B29D 11/00; B29C 45/14; B29C 45/36
[52] U.S. Cl. .......................... 264/1.25; 249/142; 425/468
[58] Field of Search .................. 264/1.24, 1.25, 264/1.1; 425/116, 117, 468, 577; 249/142

[56] References Cited

U.S. PATENT DOCUMENTS

| | | | |
|---|---|---|---|
| 4,711,752 | 12/1987 | Deacon et al. | 264/1.25 |
| 5,441,397 | 8/1995 | Eriksen et al. | 264/1.25 |
| 5,587,116 | 12/1996 | Johnson et al. | 264/1.25 |

FOREIGN PATENT DOCUMENTS

| | | |
|---|---|---|
| 0 088 410 | 9/1983 | European Pat. Off. . |
| 0 514 722 | 11/1992 | European Pat. Off. . |
| 0 514 923 | 11/1992 | European Pat. Off. . |
| 58-152212 | 9/1983 | Japan . |
| 2 276 583 | 10/1994 | United Kingdom . |

OTHER PUBLICATIONS

NTT Review, vol. 5, No. 4, Jul. 1, 1993, pp. 82–89, XP 000385448, Toshiaki Satake "US Conec Spreads MT Connector Into North American Markets", p. 85; Fig. 4.

*Primary Examiner*—Mathieu D. Vargot
*Attorney, Agent, or Firm*—Frishauf, Holtz, Goodman, Langer & Chick, P.C.

[57] ABSTRACT

A method for manufacturing a ferrule having butt end face on the front and positioning holes on both sides in the width direction and formed with plurality of fiber holes for inserting optical fibers, arranged in such a manner as to be inclined in the thickness direction, by using at least two molds which are arranged in an opposed manner and either or both of which can be moved in the opening/closing direction. Each of at least two molds has a first forming wall for forming the butt end face and a second forming wall for forming a working portion for applying a pressing force perpendicular to the butt end face at the rear of the ferrule. A core for forming the fiber hole and molding pins for forming the positioning holes are arranged in parallel and held in such a manner as to be inclined at a predetermined angle θ in the thickness direction of the ferrule molded by at least two molds.

26 Claims, 7 Drawing Sheets

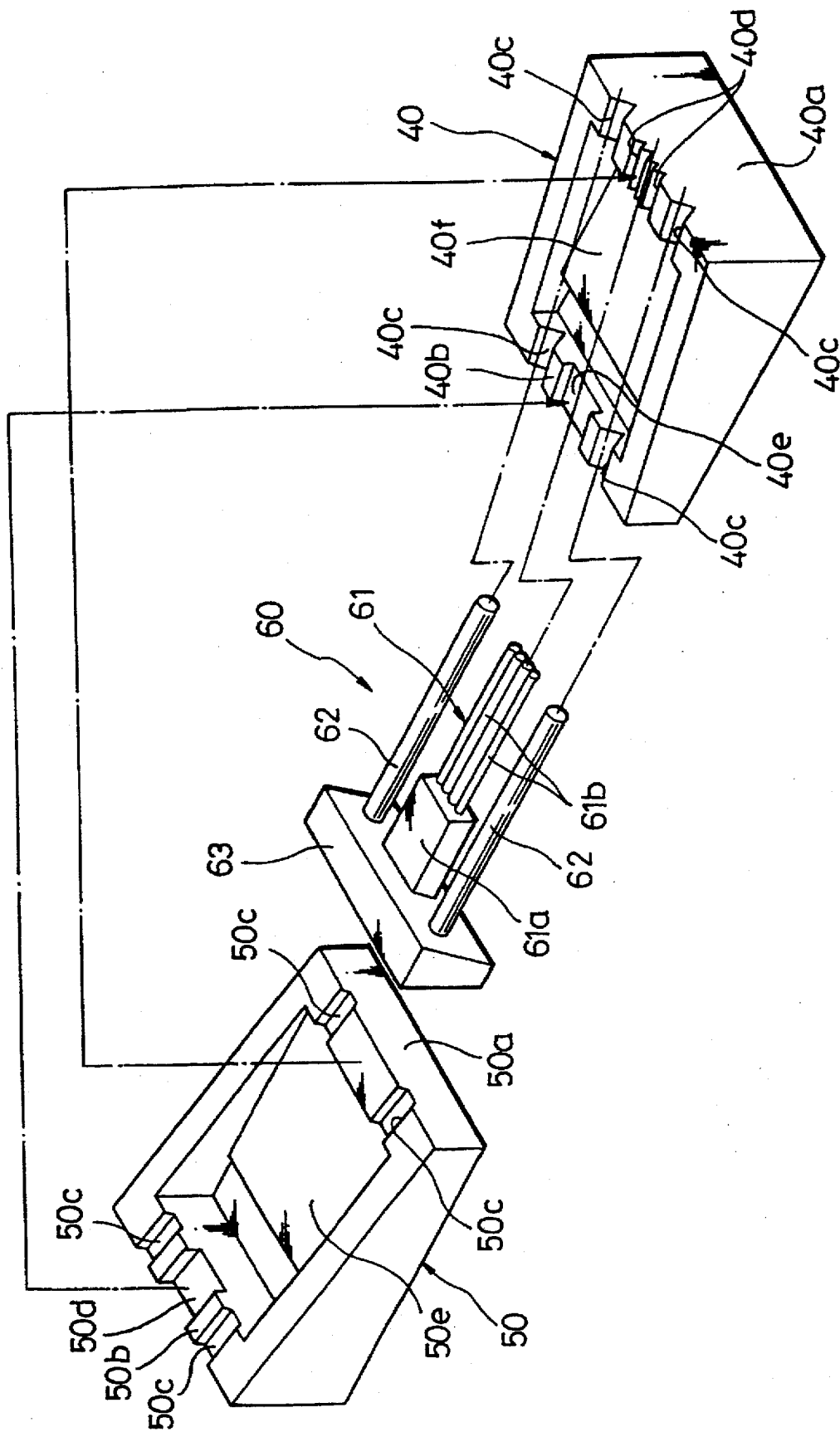

METHOD AND APPARATUS FOR MANUFACTURING A FERRULE

BACKGROUND OF THE INVENTION

1. Field of the Invention

The present invention relates to a method for manufacturing a ferrule used for an optical connector which enables butt joint without using a refractive index matching agent for restricting connection loss.

2. Description of Prior Art

An optical connector 1 shown in FIG. 9 is known as an optical connector used as connecting means of an optical communication line.

The optical connector 1, which enables butt joint between optical connectors 1, 1 without using a refractive index matching agent, has a resin ferrule 3 installed at the end of a ribbon fiber 2 having a plurality of optical fibers 2a.

The ribbon fiber 2 is formed into a tape shape by arranging a plurality of optical fibers 2a in parallel at predetermined intervals. The ferrule 3 has a front butt end face 3a inclining at an angle of 6 to 8 degrees and a plurality of optical fibers 2a arranged therein in parallel at predetermined intervals. For the ferrule 3, the tip end of the optical fiber 2a is exposed on the butt end face 3a and the end face thereof is polished, and two pin holes 3b extending in the butt direction are formed on both sides of the optical fibers 2a.

In the optical connector 1, the light transmitted through the optical fiber 2a and reflected at the end face is dissipated from the optical fiber 2a by the inclination of the tip end of the optical fiber 2a and the butt end face 3a of the ferrule 3 to prevent the reverse movement of the reflected light. In other words, the optical connector 1 restricts the connection loss caused by the butt joint with another optical connector 1 without using a refractive index matching agent by the inclination of the butt end face 3a of the ferrule 3.

The ferrule 3 of the aforementioned optical connector is manufactured in the following process: A ferrule having an end face perpendicular to the butt direction is molded by injecting resin into a mold, and then the end face is ground obliquely and polished.

Therefore, when the aforementioned optical connector having a butt end face is connected in a butting manner to another optical connector of the same type, a component of force is produced in the inclining direction of the butt end face by the pressing force of the two connectors. Consequently, a discrepancy of optical axes occurs between the corresponding optical fibers, resulting in an increase in connection loss. To solve this problem, a solution in which the optical axis is shifted beforehand in the direction reverse to the direction of discrepancy has been proposed. However, the shift amount is unstable because of unstable frictional force on the butt end face, so that this solution is not a satisfactory one.

Also, in the aforementioned optical connector, the angular accuracy of the butt end face with respect to the pin hole depends on the amounts of grinding and polishing after the ferrule is installed to the end of the ribbon fiber. Therefore, it is very difficult to obtain the uniform inclination angle among many optical connectors of the same type, so that a gap may be created between the butt end faces when two optical connectors are connected, resulting in an increase in connection loss.

SUMMARY OF THE INVENTION

An object of the present invention is to provide a method for manufacturing a ferrule used for an optical connector which has a low connection loss without using a refractive index matching agent and enables stable butt joint.

According to the present invention, to achieve the above object, in a method for manufacturing a ferrule having a butt end face on the front and positioning holes on both sides in the width direction and formed with a plurality of fiber holes for inserting optical fibers, arranged in such a manner as to be inclined in the thickness direction, by using at least two molds which are arranged in an opposed manner and either or both of which can be moved in the opening/closing direction, a ferrule is molded in such a configuration that each of at least two molds has a first forming wall for forming the butt end face and a second forming wall for forming a working portion for applying a pressing force perpendicular to the butt end face at the rear of the ferrule, and a core for forming the fiber hole and molding pins for forming the positioning holes are arranged in parallel and held in such a manner as to be inclined at a predetermined angle $\theta$ in the thickness direction of the ferrule molded by at least two molds.

Preferably, the inclination angle $\theta$ is in the range of $(90-\theta_{c1})/2 < \theta < \theta_{co}$, where $\theta_{co}$ is the critical angle of light emitted from an optical fiber core to the air, and $\theta_{c1}$ is the critical angle of light emitted from the optical fiber core to a clad.

Preferably, the molding pins are positioned by V grooves formed on the first and second forming walls of one mold and trapezoidal grooves formed on the first and second forming walls of the other mold.

Still preferably, the core has a body and a plurality of pins disposed to the body.

Still preferably, the pins of core are positioned by V grooves formed on the first and second walls of one mold and the top plates of the first and second forming walls of the other mold.

Preferably, the core for forming the fiber holes and the molding pins for forming the positioning holes are mounted integrally to a support member, and the support member is positioned together with the core and the molding pins by at least two molds to mold the ferrule.

Still preferably, the core has a body and a plurality of pins disposed to the body.

Still preferably, the body of the core is positioned by a positioning groove formed on the second forming walls of both the molds, the pins of the core are positioned by V grooves formed on the first and second walls of one mold and the top plates of the first and second forming walls of the other mold, and the molding pins are positioned by V grooves formed on the first and second forming walls of one mold and trapezoidal grooves formed on the first and second forming walls of the other mold.

Preferably, the ferrule is manufactured by using a thermosetting resin or a thermoplastic resin, and by using a transfer molding method or an injection molding method.

The molded ferrule has an appearance of a rectangular prism shape having the butt end face and the rear face which are parallel with each other like the conventional ferrule, but the optical fiber insertion holes and the positioning pin insertion holes are formed so as to be inclined in the thickness direction.

According to the method for manufacturing a ferrule in accordance with the present invention, a ferrule used for an optical connector which has a low connection loss without using a refractive index matching agent and enables stable butt joint can be manufactured efficiently.

In manufacturing the ferrule, when the inclination angle of the core forming the fiber holes and the molding pins forming the positioning holes is in the range of $(90-\theta_{c1})/2<\theta<\theta_{co}$, where $\theta_{co}$ is the critical angle of light emitted from the optical fiber core to the air, and $\theta_{c1}$ is the critical angle of light emitted from the optical fiber core to the clad, for the reason described below, in the manufactured optical connector, the transmitted light is emitted from the core without being totally reflected at the end face of the optical fiber, so that the increase in connection loss can be prevented.

FIG. 10 is a sectional view for illustrating, using a model, the reason why the total reflection is prevented at the end face in an optical fiber 8 having an end face constituting an inclined surface (inclination angle $\theta=\theta$in).

The optical fiber 8, having a core 8a and clad 8b, is formed with an end face 8c constituting an inclined surface. The optical fiber 8 is in contact with the air at the end face 8c. The refractive indexes of the core, the clad, and the air are set to n1, n2, and n0, respectively.

In general, when the end face 8c of the optical fiber 8 is at right angles to the optical axis AL, 3 to 4% of the light transmitted in the core 8a is reflected by the difference in refractive index between the core 8a and the air because the end face 8c is in contact with the air. This reflected light is turned into a reflected return light in the backward direction by total reflection when the angle of incidence from the core 8a to the clad 8b exceeds the critical angle $\theta_{c1}$.

Contrarily, when the end face 8c of the optical fiber 8 is inclined (inclination angle=$\theta=\theta$in), the angle of incidence from the core 8a to the clad 8b can be smaller than the critical angle $\theta_{c1}$. At this time, the critical angle $\theta_{c1}$ can be obtained as follows when, for example, the refractive index of core n1=1.465 and the refractive index of clad n2=1.46.

$$\theta_{c1}=\sin^{-1}(n2/n1)=\sin^{-1}(1.46/1.465)=85°$$

Therefore, the lower limit of the inclination angle $\theta$ is $(90°-85°)/2=2.5°$ from FIG. 10.

Consequently, if the inclination angle $\theta$ of the end face 8c of the optical fiber 8 is 2.5° or larger, the light emitted from the core 8a enters the mating optical fiber connected to the optical fiber 8 so that the light is transmitted. Also, since the end face 8c of the optical fiber 8 is inclined, a reflected light is generated when the light is emitted from the core 8a, but the reflected light enters the clad 8b from the core 8a, and attenuates gradually, so that the reflected light is not turned into a reflected return light in the backward direction.

On the other hand, the upper limit of the inclination angle $\theta$ is the critical angle $\theta_{co}$ of the light emitted from the core 8a of the optical fiber 8 to the air. The critical angle $\theta_{co}$ can be obtained as follows when, for example, the refractive index of core n1=1.465 and the refractive index of air n0=1.

$$\theta_{co}=\sin^{-1}(n0/n1)=\sin^{-1}(1/1.465)=43°$$

Based on the above description, the inclination angle $\theta$ can be expressed by the following general formula.

$$(90-\theta_{c1})/2<\theta<\theta_{co}$$

If the molding pins are positioned by V grooves formed on the first and second forming walls of one mold and trapezoidal grooves formed on the first and second forming walls of the other mold, the molding pins can be positioned accurately, so that the positioning holes can be formed in the ferrule to be molded with high accuracy.

If the core has a body and a plurality of pins disposed to the body, and the pins of core are positioned by V grooves formed on the first and second walls of one mold and the top plates of the first and second forming walls of the other mold, the core positioning accuracy can be improved, so that the fiber holes of the ferrule to be molded can be formed with high accuracy.

Further, if the core for forming the fiber holes and the molding pins for forming the positioning holes are mounted integrally to a support member, and the support member is positioned together with the core and the molding pins by at least two molds to mold the ferrule, the core and the molding pins can be drawn with the mold being clamped.

Also, if the body of the core is positioned by a positioning groove formed on the second forming walls of both the molds, the pins of the core are positioned by V grooves formed on the first and second walls of one mold and the top plates of the first and second forming walls of the other mold, and the molding pins are positioned by V grooves formed on the first and second forming walls of one mold and trapezoidal grooves formed on the first and second forming walls of the other mold, the accuracy in positioning the core and molding pins can be improved, so that the ferrule can be molded with high accuracy.

If the ferrule is manufactured by using a thermosetting resin or a thermoplastic resin, and by using a transfer molding method or an injection molding method, the existing apparatus can be used.

The above and other objects, features, and advantages of the present invention will be better understood from the following detailed description taken in connection with the accompanying drawings.

BRIEF DESCRIPTION OF THE DRAWINGS

FIG. 7 is a perspective view of another mold having a lower mold and an upper mold for manufacturing a ferrule by a method in accordance with the present invention;

DETAILED DESCRIPTION OF THE PREFERRED EMBODIMENTS

One embodiment of the present invention will be described in detail below with reference to FIGS. 1 to 8.

Figure 1:
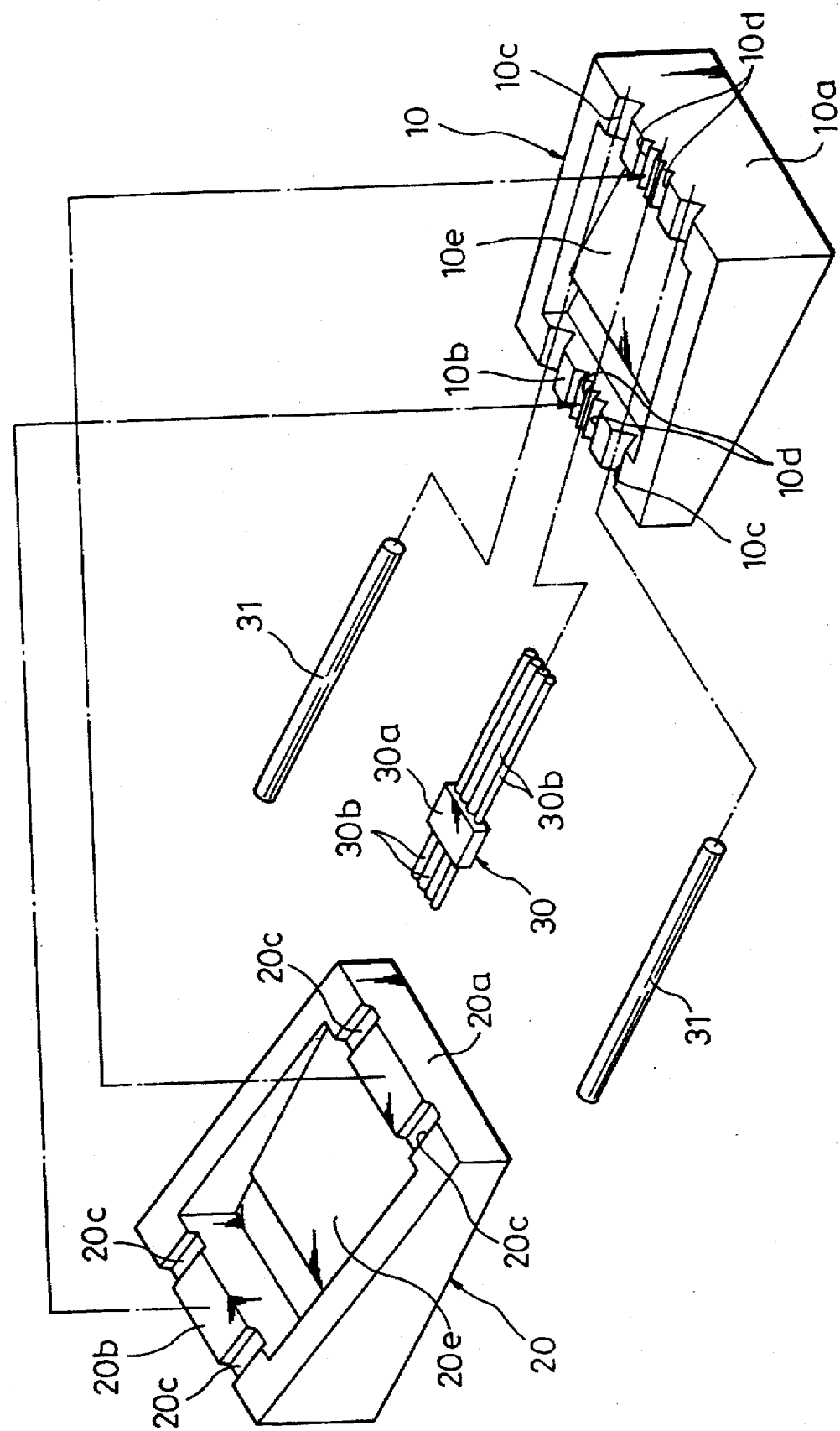
FIG. 1 is a perspective view of a mold having a lower mold and an upper mold for manufacturing a ferrule by a method in accordance with the present invention.

FIG. 1 shows a mold having a lower mold 10 and an upper mold 20 for manufacturing a ferrule by the method in accordance with the present invention, in which a core 30 and positioning hole molding pins (hereinafter called "molding pins") 31, 31 are arranged between the lower mold 10 and the upper mold 20. In FIG. 1, the upper mold 20 is drawn in an upside-down manner to clarify the construction thereof, and assembled to the lower mold 10 by turning over as indicated by the alternate long and short dash lines.

The lower mold 10 is raised/lowered by driving means, not shown, in such a manner that the mold can be clamped or opened. The lower mold 10 has a forming wall 10a for forming a butt end face of a ferrule to be molded and a forming wall 10b for forming, at the rear of the ferrule, a rear end face to which a pressing force perpendicular to the butt end face is applied. The lower mold 10 is formed so as to have a top surface inclined at an angle of 8 degrees with respect to the horizontal plane, the forming wall 10a being higher than the forming wall 10b. The forming walls 10a and 10b have V grooves 10c, 10c for positioning the molding pins 31, formed on both sides of the top surface. Between the V grooves 10c, 10c are formed four positioning grooves 10d consisting small V grooves for positioning fiber insertion hole molding pins (hereinafter called "molding pins") 30b, described later, of the core 30. The lower mold 10 has a concave portion 10e corresponding to the lower half of the ferrule to be molded.

The upper mold 20 has a forming wall 20a for forming a butt end face of the ferrule to be molded and a forming wall 20b for forming, at the rear of the ferrule, a rear end face to which a pressing force perpendicular to the butt end face is applied. The upper mold 20 is formed so as to have a top surface inclined at an angle of 8 degrees with respect to the horizontal plane, the forming wall 20a being lower than the forming wall 20b. The forming walls 20a and 20b have trapezoidal grooves 20c, 20c for positioning the molding pins 31, which are formed at the positions corresponding to the V grooves 10c, 10c on both sides of the top surface of the lower mold 10. The upper mold 20 has a concave portion 20e corresponding to the upper half of the ferrule to be molded.

As described above, the top surfaces of the lower mold 10 and the upper mold 20 are inclined at an angle of 8 degrees with respect to the horizontal plane. This is because the fiber holes of the ferrule to be molded, and in turn the optical fibers of an optical connector to be manufactured are inclined at a predetermined angle θ in the direction of ferrule thickness, as described later. By thus inclining the optical fibers in the thickness direction, the end face of optical fiber constitutes an inclined surface at the butt end face of the optical connector, so that the reflected component, which is reflected at the fiber end face, of the light transmitted in the optical fibers is prevented from returning. That is to say, a reflected return light is prevented.

At this time, the inclination angle θ (see FIG. 2) is set to the range of $(90-\theta_{c1})/2 < \theta < \theta_{co}$, where $\theta_{co}$ is the critical angle of light emitted from an optical fiber core to the air and $\theta_{c1}$ is the critical angle of the light emitted from the optical fiber core to a clad. If this range is set, the light transmitted in the optical fibers is emitted from the core without being totally reflected at the optical fiber end face, so that the increase in connection loss can be prevented. For example, if the core of optical fiber is glass having a refractive index of 1.465, and the refractive index of the air is 1, the critical angle $\theta_{co}$ is about 43 degrees.

A runner for supplying resin for molding the ferrule is formed either of the lower mold 10 or the upper mold 20, though being omitted in the figure.

The core 30 has a body 30a and four molding pins 30b as shown in FIG. 1. The end face of the body 30a on the side of the forming walls 10b and 20b forming the rear end face of the ferrule is formed into an inclined surface. The four molding pins 30b, which are used for molding fiber insertion holes in the ferrule, protrude from the body 30a. The inclination angle of the inclined surface of the body 30a is set to 8 degrees, which is equal to the inclination angle of the top surfaces of the lower and upper molds 10 and 20.

The molding pin 31, which is a core for forming, in the ferrule, an insertion hole for positioning pin, is arranged so as to be laid between the V grooves 10c, 10c at the opposed positions on the lower mold 10 as shown in FIG. 1.

According to the method of the present invention, a ferrule is molded in a manner described below by using the above-described mold.

First, as described in FIG. 1, the core 30 and the two molding pins 31 were arranged on the lower mold 10 by positioning the molding pins 31 by means of the V grooves 10c, 10c, and the molding pins 30b by means of the positioning grooves 10d.

Figure 2:
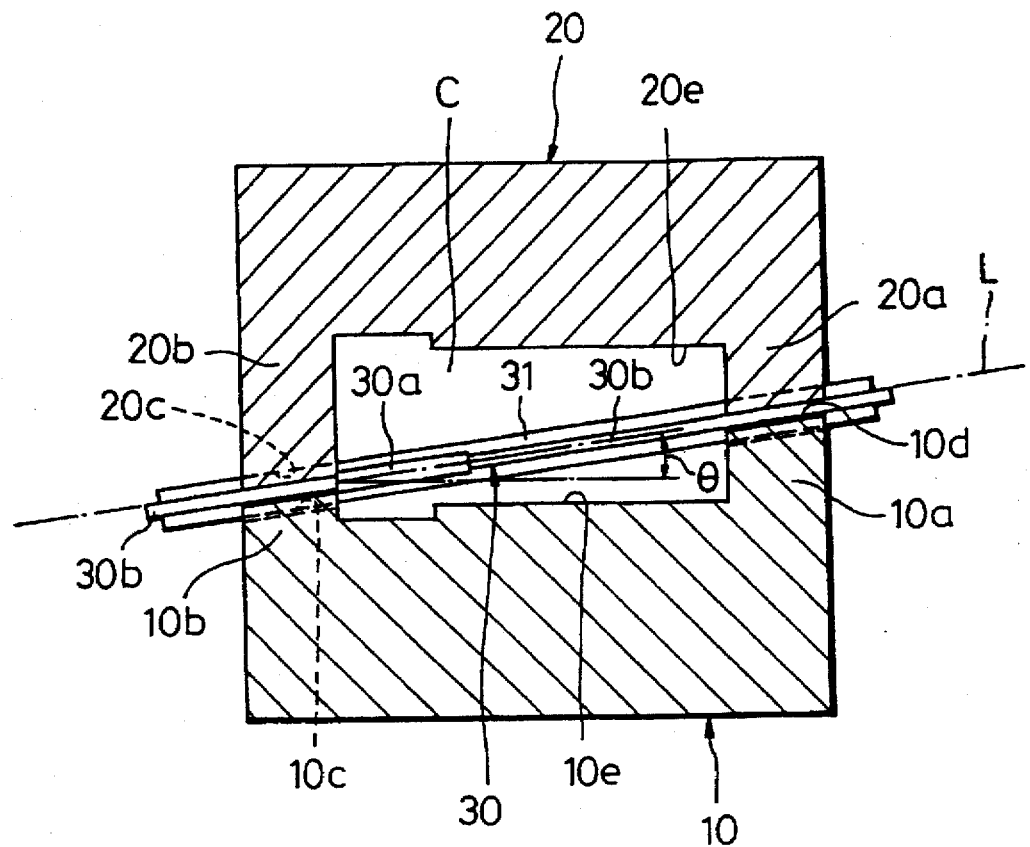
FIG. 2 is a side sectional view of the mold shown in FIG. 1, which has been clamped.
Figure 3:
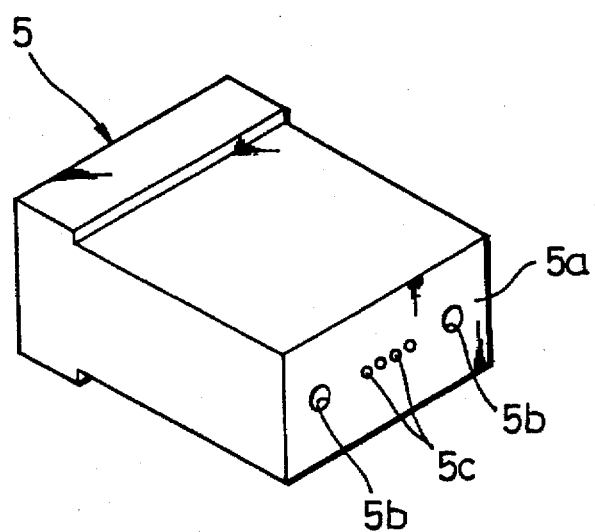
FIG. 3 is a perspective view of a ferrule molded by using the mold shown in FIG. 1.

Next, the lower mold 10 was raised and assembled to the upper mold 20, the mold being clamped as shown in FIG. 2. Thereby, the core 30 and the two molding pins 31 were arranged, by the lower and upper molds 10 and 20, in parallel with the butt direction of ferrule to be molded, and were held while being inclined (inclination angle θ=8 degrees) in the thickness direction. The alternate long and short dash line L in FIG. 2 denotes a parting line for the lower and upper molds 10 and 20. In the lower and upper molds 10 and 20, a cavity C for ferrule was formed by the concave portions 10e and 20e.

Then, a thermosetting resin such as epoxy resin was injected from the runner formed in either of the lower mold 10 or the upper mold 20 into the cavity C to mold a ferrule.

After the injected epoxy resin was cured by heating, the lower mold 10 was lowered to open the mold, the molded product being taken out.

After that, the core 30 and the molding pins 31, 31 were drawn from the molded product. Thus, the manufacture of the ferrule 5 shown in FIG. 3 was completed.

The ferrule 5 thus manufactured had a butt end face 5a formed on the front, and two insertion holes 5b for inserting positioning pins, formed on both sides in the width direction. Between the two insertion holes 5b were formed four fiber holes 5c for inserting optical fibers. The two insertion holes 5b and four fiber holes 5c were in parallel with each other and inclined at an angle of 8 degrees.

At this time, the molded products of several shots were taken out at random to make accuracy check of the manufactured ferrules 5. The parallelism of the insertion holes 5b and fiber holes 5c and the inclination angle between each hole and the butt end face 5a were measured. The measurements verified that they were within the specified tolerance.

By repeating the same operation, the ferrule 5 was manufactured continuously.

The ferrule 5 thus manufactured was installed to the end of a ribbon fiber 6 by inserting optical fibers 6a into the four fiber holes 5c and fixing them with an adhesive.

Figure 4:
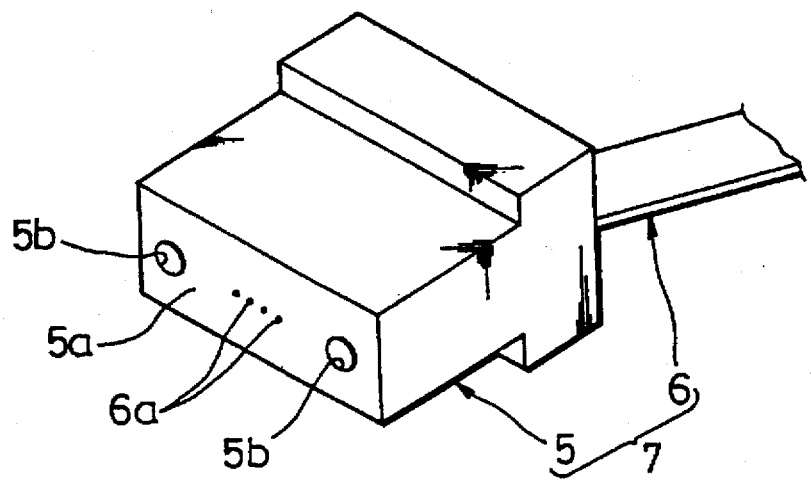
FIG. 4 is a perspective view of an optical connector assembled by fixing optical fibers to the ferrule shown in FIG. 3.

Then, the ferrule 5 was assembled to an optical connector 7 shown in FIG. 4 by grinding and plishing the but end face 5a by about 30 μm.

Figure 9:
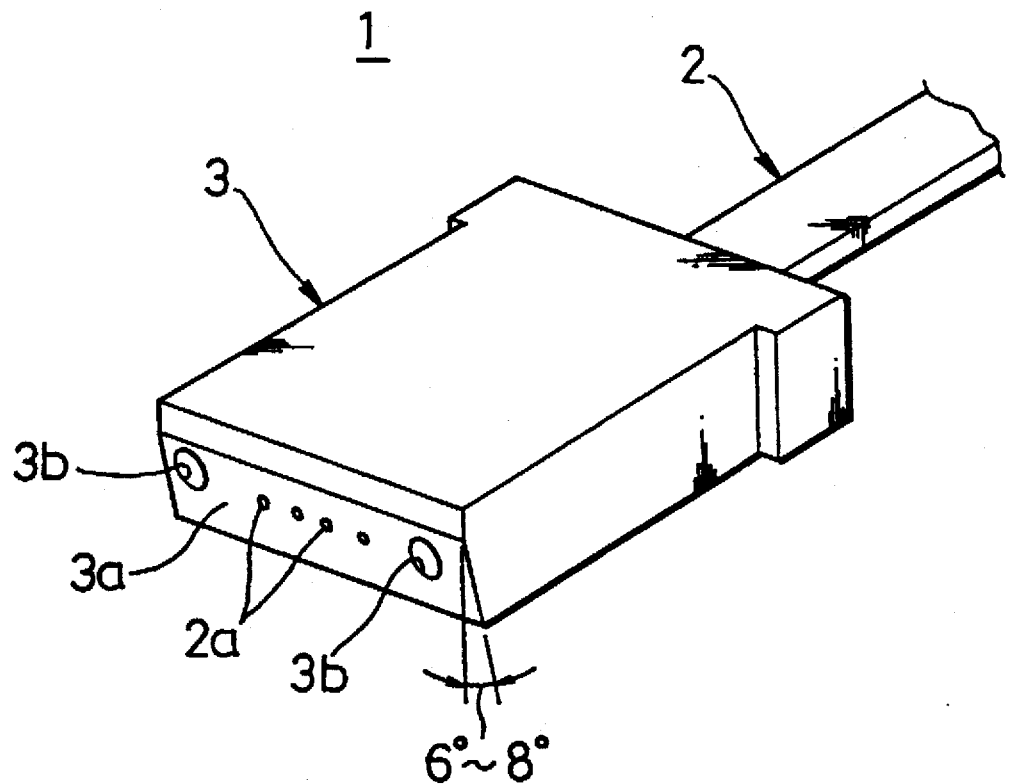
FIG. 9 is a perspective view of a conventional optical connector.
Figure 10:
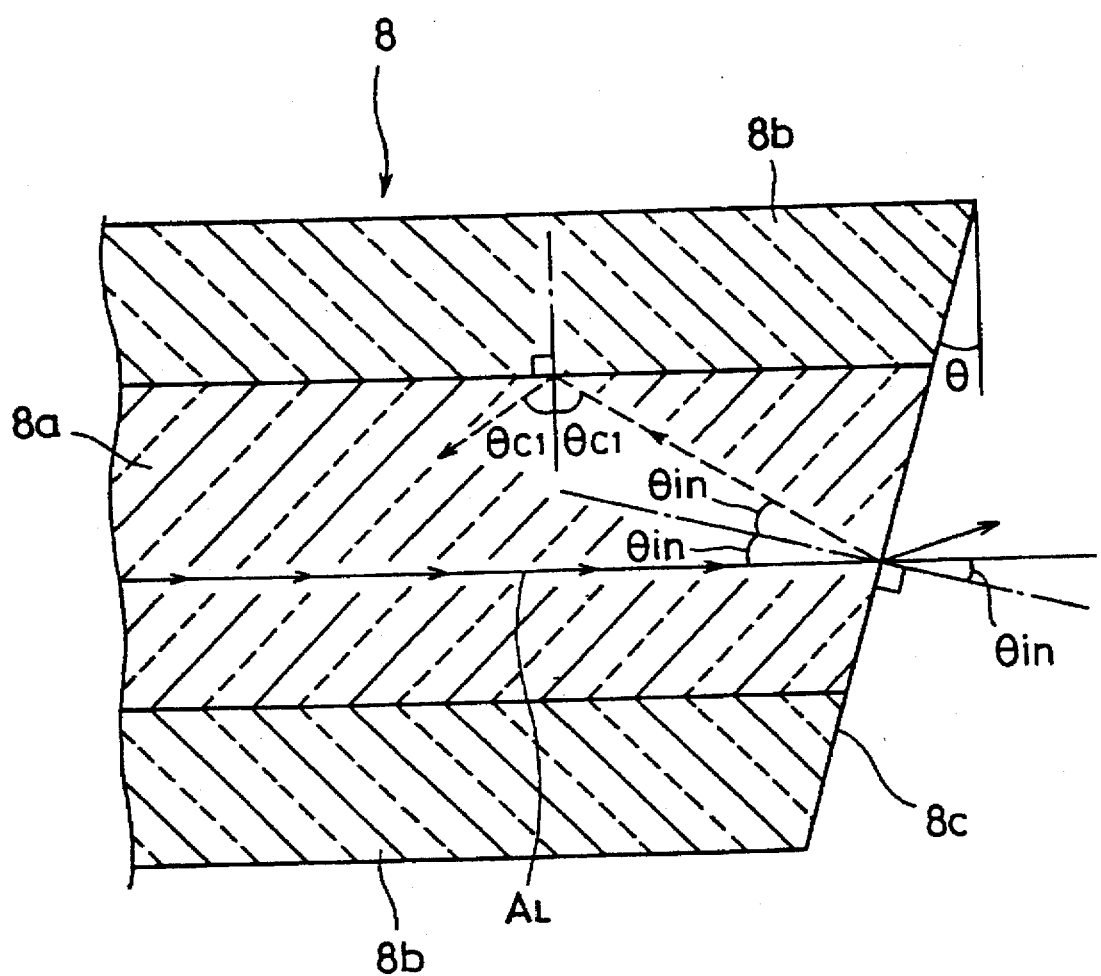
FIG. 10 is a sectional view for illustrating, using a model, the reason why the total reflection is prevented at the end face by an inclination angle $\theta$ in an optical fiber having an inclined end face.

For the optical connector 7 thus manufactured, the connection loss and the reflected light at the end face, the reflected light of inspection light transmitted through each fiber 6a, were measured. As a result, it was found that the reverse movement of reflected light could be prevented at the same level as that of the conventional optical connector 1 shown in FIG. 9, in which the butt end face 3a is inclined. Moreover, with the method in accordance with the present invention, an optical connector having a low connection loss can be obtained stably. The measurement of the connection loss of the manufactured optical connector 7 revealed that the connection loss was 0.5 dB or less, which value was almost equal to that of the conventional optical connector in which the butt end face is at right angles to the butt direction.

Figure 5:
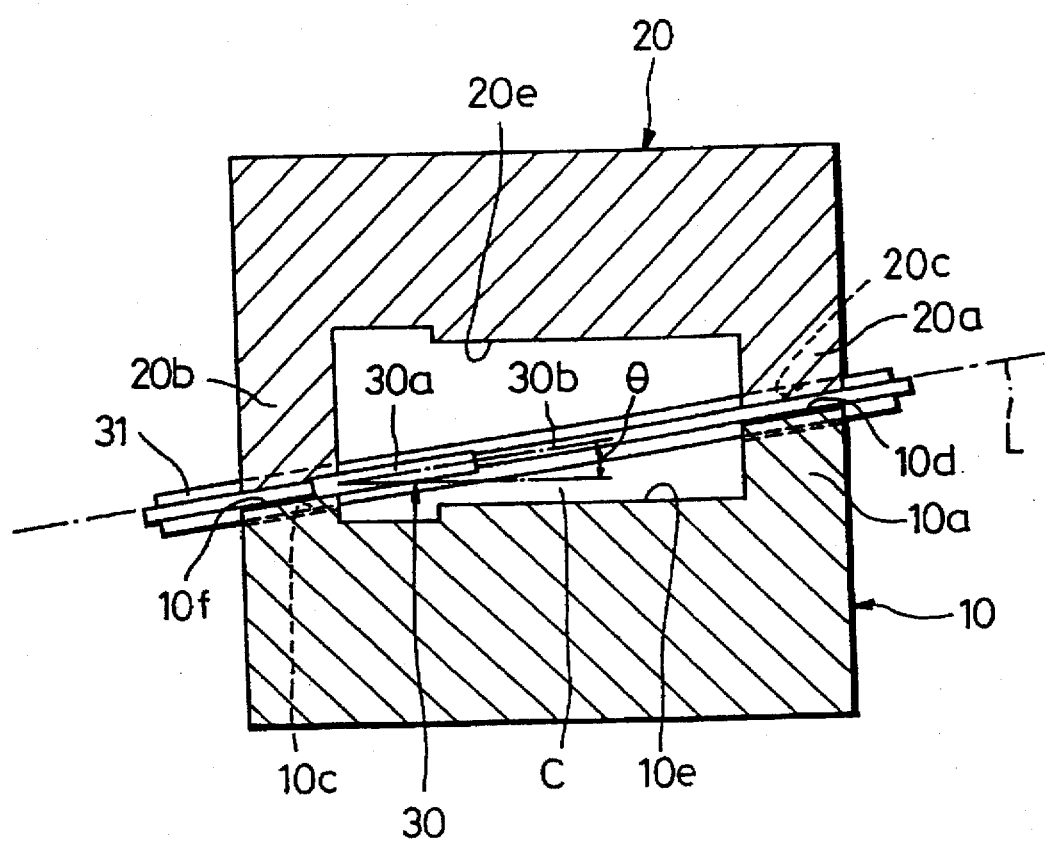
FIG. 5 is a side sectional view of a mold, showing a modification of mold.

In this method, the core 30 was formed so that the forming wall 10b, 20b side of the body 30a constituted an inclined surface as shown in FIG. 2. Alternatively, as shown in FIG. 5, the body 30a may be formed into a shape of rectangular prism, and the body 30a and the four molding pins 30b may be held between the molds 10 and 20.

In this case, the lower mold 10 was formed with a concave groove 10f instead of the four positioning grooves 10d consisting of V grooves formed on the forming wall 10b side, so that the body 30a was positioned by this concave groove 10f.

Figure 6:
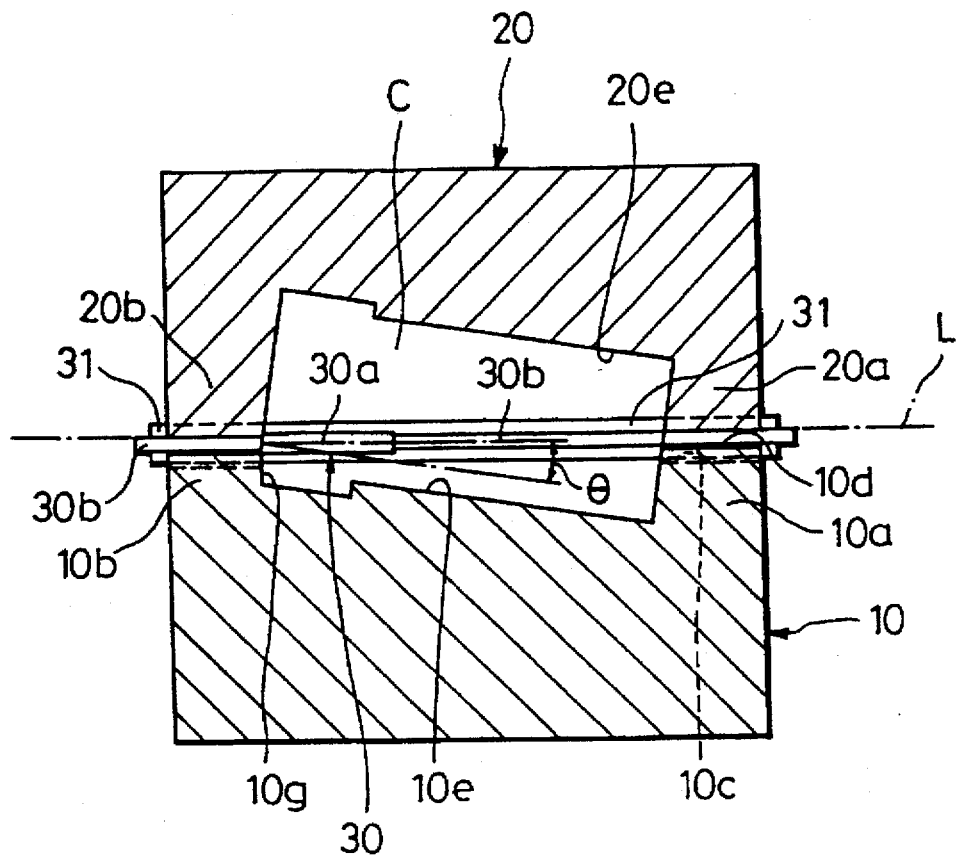
FIG. 6 is a side sectional view of a mold, showing another modification of mold.

Further, as shown in FIG. 6, the lower mold 10 and the upper mold 20 may be formed in such a manner that the parting line L is horizontal by making the heights of the forming walls 10a and 10b and the forming walls 20a and 20b equal.

In this case, the lower mold 10 and the upper mold 20 were formed by inclining the concave portions 10e and 20e so that the butt direction of the ferrule to be molded was inclined at a predetermined angle (8 degrees) with respect to the horizontal plane. The lower mold 10 was formed with a chamfering portion 10g so as to be opened easily merely by lowering because the concave portions 10e and 20e were inclined.

In the ferrule obtained in the above embodiments, the parting line L of the lower mold 10 and the upper mold 20 coincided with the center axes of the fiber insertion holes and the positioning pin insertion holes. Therefore, the center axes of the fiber insertion holes and the positioning pin insertion holes can be verified from the trace of parting line L remaining on the side surface of the molded ferrule.

Figure 8:
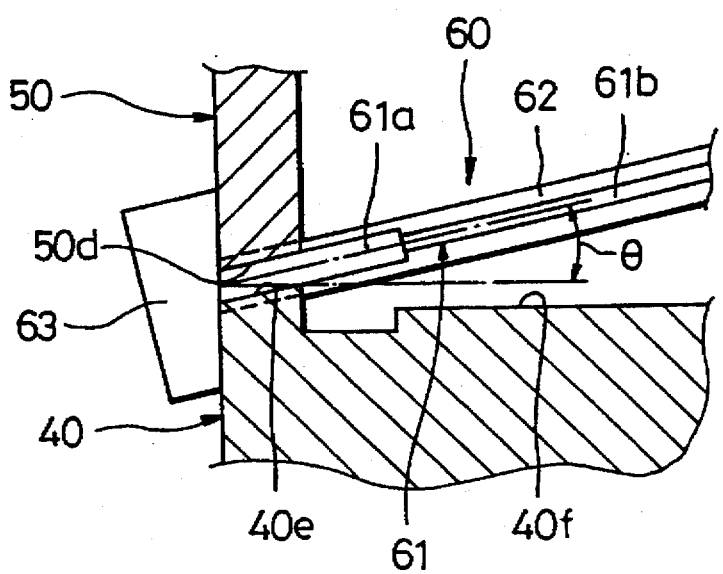
FIG. 8 is a sectional view of a core on the body side thereof with the mold shown in FIG. 7 being clamped.

Further, the mold for manufacturing ferrules by the method in accordance with the present invention may be configured as shown in FIGS. 7 and 8.

In this case, as shown in FIG. 7, the mold has a lower mold 40 and the upper mold 50, and a core member 60 is disposed between the lower and upper molds 40 and 50.

The lower mold 40 is raised/lowered by driving means (not shown) in such a manner that the mold can be clamped or opened. The lower mold 40 has a forming wall 40a for forming a butt end face of a ferrule to be molded and a forming wall 40b for forming, at the rear of the ferrule, a rear end face to which a pressing force perpendicular to the butt end face is applied. The lower mold 40 is formed so as to have a top surface inclined at an angle of 8 degrees with respect to the horizontal plane, the forming wall 40a being higher than the forming wall 40b. The forming walls 40a and 40b have V grooves 40c for positioning positioning hole molding pins (hereinafter called "molding pins") 62, described later, formed on both sides of the top surface. The forming wall 40a has four positioning grooves 40d consisting of small V grooves for positioning fiber insertion hole molding pins (hereinafter called "molding pins") 61b, described later, of the core member 60, formed between the V grooves 40c, 40c. The forming wall 40b has a concave groove 40e for forming a body 61a, described later, of the core 61, formed between the V grooves 40c, 40c. The lower mold 10 has a concave portion 40f corresponding to the lower half of the ferrule to be molded.

The upper mold 50 has a forming wall 50a for forming a butt end face of the ferrule to be molded and a forming wall 50b for forming, at the rear of the ferrule, a rear end face to which a pressing force perpendicular to the butt end face is applied. The upper mold 50 is formed so as to have a top surface inclined at an angle of 8 degrees with respect to the horizontal plane, the forming wall 50a being lower than the forming wall 50b. The forming walls 50a and 50b have trapezoidal grooves 50c, 50c for positioning the molding pins 62, which are formed at the positions corresponding to the V grooves 40c, 40c on both sides of the top surface of the lower mold 40. The forming wall 50b has a concave groove 50d for positioning the body 61a, described later, of the core 61, formed between the trapezoidal grooves 50c, 50c. The upper mold 50 has a concave portion 50e corresponding to the upper half of the ferrule to be molded.

A runner for supplying resin for molding the ferrule is formed either of the lower mold 40 or the upper mold 50, though being omitted in the figure.

For the core member 60, as shown in FIG. 7, the core 61 and the molding pins 62, 62 are integrally supported by a support plate 63 so as to be inclined at an angle (8 degrees) equal to the inclination angle of the top surface of the lower and upper molds 40 and 50 with the tip ends thereof being at an up position.

The core 61 has the body 61a and the four molding pins 61b. The four molding pins 61b, for molding the fiber insertion holes in the ferrule, protrude from the body 61a.

The molding pin 62, being a core for forming the positioning pin insertion hole in the ferrule, is arranged so as to be laid between the V grooves 40c, 40c at the opposite positions on the lower mold 40 as shown in FIG. 7.

The support plate 63 is engaged with the side surfaces of the forming walls 40b and 50b as shown in FIG. 8 when the lower mold 40 and the upper mold 50 are clamped to each other, so that the core 61 and the molding pins 62 are positioned in the longitudinal direction thereof.

For the above-described mold, the ferrule was molded by positioning the support plate 63, mounted integrally to the core 61 and the molding pins 62, 62, together with the core 61 and the molding pins 62, 62 by means of the lower mold 40 and the upper mold 50.

Specifically, the support plate 63 was engaged with the side surface of the forming wall 40b disposed on the lower mold 40. At the same time, the body 61a of the core 61 was positioned by the concave groove 40e, each of the four molding pins 61b was positioned by the corresponding positioning groove 40d, and each of the molding pins 62 was positioned by the corresponding V groove 40c. Then, the lower mold 40 was raised to be clamped to the upper mold 50.

At this time, the core 61 and the molding pins 62, 62 were inclined at a specific angle θ (=8 degrees) in the thickness direction of the ferrule to be molded.

Hereafter, the ferrule was molded in the same way as the case where the lower and upper molds 10 and 20 are used. In this case, since the core 61 and the molding pins 62, 62 were mounted integrally to the support plate 63 in this embodiment, the core 61 and the molding pins 62, 62 could be drawn from the molded ferrule merely by pulling the support plate 63 without opening the lower mold 40 and the upper mold 50 after the ferrule had been molded. Therefore, the time taken for one cycle for molding the ferrule could be shortened.

In the molded ferrule, the insertion holes for inserting the positioning pins and the four fiber holes for inserting optical fibers were formed so as to be inclined at an angle of 8 degrees in the thickness direction. When an optical connector was assembled, therefore, the end face of the optical fiber constituted an inclined surface at the butt end face of the optical connector. For the optical connector using the ferrule manufactured by the method in accordance with the present invention, therefore, though the butt end face was at right angles to the butt direction, the fiber end face of the light transmitted through the optical fiber was at an angle with respect to the surface perpendicular to the line direction, so that the reflected return light at the fiber face could be prevented.

Although a thermosetting resin has been used in the above embodiments, a thermoplastic resin may also be used. Concerning the molding method, a transfer molding method or an injection molding method may be used.

In the above embodiments, the case where four fiber insertion holes are disposed has been described. However, the number of fiber insertion holes can be changed appropriately according to the ferrule to be molded.

What is claimed is:

1. A method for manufacturing a ferrule having a butt end face on a front portion, positioning holes on both sides in a width direction, and a plurality of fiber holes for inserting optical fibers, said method comprising:

arranging at least two molds in an opposed manner such that one or both of said at least two molds can be moved in an opening and closing direction, each of said at least two molds having a first forming wall for forming said butt end face of said ferrule and a second forming wall for forming a working portion for applying a pressing force perpendicular to said butt end face at a rear portion of said ferrule;

providing a core for forming said plurality of fiber holes and molding pins for forming said positioning holes, respectively, said core and said molding pins being arranged in parallel and held in such a manner so as to be inclined at a predetermined angle θ with respect to said at least two molds; and molding said ferrule in said at least two molds with said core and said molding pins arranged and held therein such that said ferrule is formed with said plurality of fiber holes and said positioning holes arranged in parallel through an entire length of said ferrule at said predetermined angle θ with respect to said ferrule.

2. The method for manufacturing a ferrule according to claim 1, wherein said predetermined angle θ is in a range of $(90-\theta_{c1})/2 < \theta < \theta_{co}$, where $\theta_{co}$ is a critical angle of light emitted from a core of said optical fiber to air, and $\theta_{c1}$ is a critical angle of light emitted from said optical fiber core to a clad.

3. The method for manufacturing a ferrule according to claim 1, wherein said molding pins are positioned by V grooves formed on said first and second forming walls of a first one of said at least two molds, and trapezoidal grooves formed on said first and second forming walls of a second one of said at least two molds.

4. The method for manufacturing a ferrule according to claim 1, wherein said core comprises a body and a plurality of pins disposed on said body.

5. The method for manufacturing a ferrule according to claim 4, wherein said pins of said core are positioned by V grooves formed on said first and second walls of a first one of said at least two molds, and top plates of said first and second forming walls of a second one of said at least two molds.

6. The method for manufacturing a ferrule according to claim 1, wherein said ferrule is molded using a thermosetting resin.

7. The method for manufacturing a ferrule according to claim 1, wherein said ferrule is molded using a thermoplastic resin.

8. The method for manufacturing a ferrule according to claim 1, wherein said ferrule is formed by transfer molding.

9. The method for manufacturing a ferrule according to claim 1, wherein said ferrule is formed by injection molding.

10. The method for manufacturing a ferrule according to claim 1, wherein said core and said molding pins are mounted integrally to a support member, and said support member is positioned together with said core and said molding pins by said at least two molds.

11. The method for manufacturing a ferrule according to claim 10, wherein said predetermined angle θ is in a range of $(90-\theta_{c1})/2 < \theta < \theta_{co}$, where $\theta_{co}$ is a critical angle of light emitted from a core of said optical fiber to air, and $\theta_{c1}$ is a critical angle of light emitted from said optical fiber core to a clad.

12. The method for manufacturing a ferrule according to claim 10, wherein said core comprises a body and a plurality of pins disposed on said body.

13. The method for manufacturing a ferrule according to claim 12, wherein:

said at least two molds comprise a first mold and a second mold, said body of said core is positioned by a positioning groove formed on said second forming walls of said first and second molds, said pins of said core are positioned by V grooves formed on said first and second walls of said first mold, and top plates of said first and second forming walls of said second mold, and said molding pins are positioned by V grooves formed on said first and second forming walls of said first mold, and trapezoidal grooves formed on said first and second forming walls of said second mold.

14. The method for manufacturing a ferrule according to claim 10, wherein said ferrule is molded using a thermosetting resin.

15. The method for manufacturing a ferrule according to claim 10, wherein said ferrule is molded using a thermoplastic resin.

16. The method for manufacturing a ferrule according to claim 10, wherein said ferrule is formed by transfer molding.

17. The method for manufacturing a ferrule according to claim 10, wherein said ferrule is formed by injection molding.

18. A molding apparatus for manufacturing a ferrule having a butt end face on a front portion, positioning holes on both sides in a width direction, and a plurality of fiber holes for inserting optical fibers, said molding apparatus comprising:

at least two molds arranged in an opposed manner such that one or both of said at least two molds can be moved in an opening and closing direction, each of said at least two molds having a first forming wall for forming said butt end face of said ferrule and a second forming wall for forming a working portion for applying a pressing force perpendicular to said butt end face at a rear portion of said ferrule; and a core for forming said plurality of fiber holes and molding pins for forming said positioning holes, respectively, said core and said molding pins being arranged in parallel and held in such a manner as to be inclined at a predetermined angle θ with respect to said at least two molds, whereby said ferrule is formed with said plurality of fiber holes and said positioning holes arranged in parallel through an entire length of said ferrule at said predetermined angle θ with respect to said ferrule.

19. The molding apparatus for manufacturing a ferrule according to claim 18, wherein said predetermined angle θ is in a range of $(90-\theta_{c1})/2<\theta<\theta_{co}$, where $\theta_{co}$ is a critical angle of light emitted from a core of said optical fiber to air, and $\theta_{c1}$ is a critical angle of light emitted from said optical fiber core to a clad.

20. The molding apparatus for manufacturing a ferrule according to claim 18, wherein said molding pins are positioned by V grooves formed on said first and second forming walls of a first one of said at least two molds, and trapezoidal grooves formed on said first and second forming walls of a second one of said at least two molds.

21. The molding apparatus for manufacturing a ferrule according to claim 18, wherein said core comprises a body and a plurality of pins disposed on said body.

22. The molding apparatus for manufacturing a ferrule according to claim 18, wherein said pins of said core are positioned by V grooves formed on said first and second walls of a first one of said at least two molds, and top plates of said first and second forming walls of a second one of said at least two molds.

23. The molding apparatus for manufacturing a ferrule according to claim 18, wherein said core and said molding pins are mounted integrally to a support member, and said support member is positioned together with said core and said molding pins by said at least two molds.

24. The molding apparatus for manufacturing a ferrule according to claim 23, wherein said predetermined angle θ is in a range of $(90-\theta_{c1})/2<\theta<\theta_{co}$, where $\theta_{co}$ is a critical angle of light emitted from a core of said optical fiber to air, and $\theta_{c1}$ is a critical angle of light emitted from said optical fiber core to a clad.

25. The molding apparatus for manufacturing a ferrule according to claim 23, wherein said core comprises a body and a plurality of pins disposed on said body.

26. The molding apparatus for manufacturing a ferrule according to claim 23, wherein said at least two molds comprise a first mold and a second mold, and:

said body of said core is positioned by a positioning groove formed on said second forming walls of said first and second molds, said pins of said core are positioned by V grooves formed on said first and second walls of said first mold, and top plates of said first and second forming walls of said second mold, and said molding pins are positioned by V grooves formed on said first and second forming walls of said first mold, and trapezoidal grooves formed on said first and second forming walls of said second mold.

* * * * *